Oct. 5, 1954　　　　　W. C. MILEWSKI　　　　　2,690,657
DEVICE FOR APPLYING AND SPREADING BUTTER TO CORN ON THE COB
Filed March 22, 1952　　　　　　　　　　　　　2 Sheets-Sheet 1
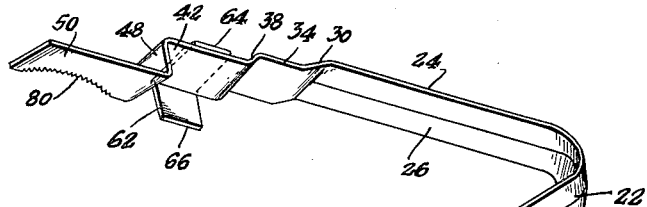
FIG. 1.
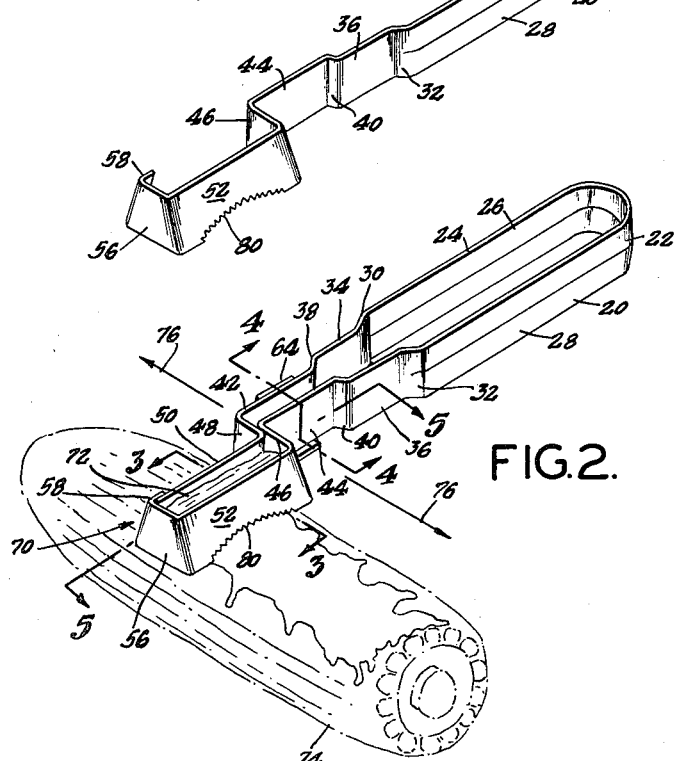
FIG. 2.
FIG. 4.
FIG. 3.
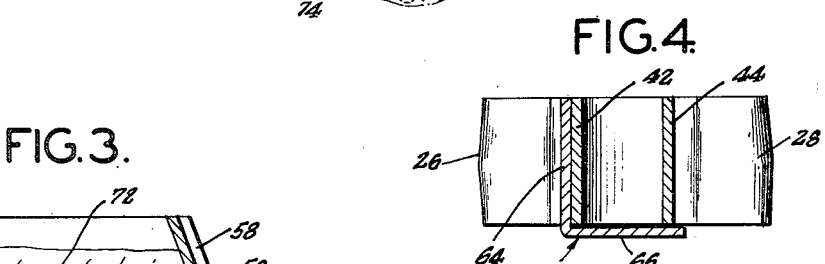
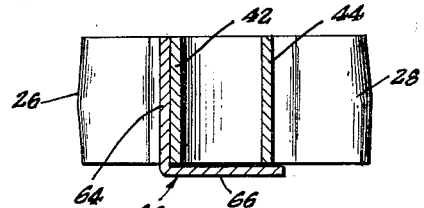
INVENTOR.
WALTER C. MILEWSKI
BY
　　　ATTORNEY.

Oct. 5, 1954 W. C. MILEWSKI 2,690,657
DEVICE FOR APPLYING AND SPREADING BUTTER TO CORN ON THE COB
Filed March 22, 1952 2 Sheets-Sheet 2

INVENTOR.
WALTER C. MILEWSKI
BY
ATTORNEY.

Patented Oct. 5, 1954

2,690,657

UNITED STATES PATENT OFFICE 2,690,657

DEVICE FOR APPLYING AND SPREADING BUTTER TO CORN ON THE COB

Walter C. Milewski, New York, N. Y.

Application March 22, 1952, Serial No. 278,084

2 Claims. (Cl. 65—12)

This invention relates to improvements in devices for spreading and applying butter to corn on the cob and the like.

An object of the invention is to provide a novel and improved device for holding a supply of butter and applying it to an ear of corn on the cob or the like.

Another object of the invention is to provide a novel and improved butter holder and applicator which has substantially no more bulk or weight than an ordinary table fork or knife, and has a compartment formed therein to receive a supply of butter which is then subjected to pressure for applying the same to the kernels of an ear of corn on the cob.

A further object of the invention is to provide a novel and improved butter holder and applicator for corn on the cob, in which there are a pair of levers, portions of which form a handle, the levers forming at their distal ends a butter receiving chamber with sloping sides, so that as the user squeezes the levers toward each other, the butter in the chamber is squeezed downwards, against the surface of the kernels of an ear of corn or the like, and thus applied smoothly therealong as the device is moved along the length of the ear of corn.

Still another object of the invention is to provide a novel and improved butter holder and applicator which is constructed to form a chamber holding a substantial quantity of butter, and for applying the same to the ear of corn without any waste whatsoever, and without danger of spilling the butter.

Still a further object of the invention is to provide a novel and improved butter holder and applicator in which the user can apply the butter to the corn at any desired speed, the butter chamber having sloping opposite walls which are movable toward each other to the degree desired by the user, to squeeze a greater or lesser quantity of butter below the lower edge of the butter chamber for spreading, so that the taste and desires of the user of the device are easily met.

Another object of the invention is to provide a novel and improved butter holder and spreader of the type described, which has a minimum of parts, and which can be readily opened out for cleaning all portions of the device, so as to maintain the utmost in sanitary conditions.

A further object of the invention is to provide a device of the character described, which is simple in design, inexpensive to manufacture, and highly effective and efficient for its intended purposes.

These and other objects and advantages of the invention will become apparent from the following description of a preferred embodiment thereof as illustrated in the accompanying drawings, forming part hereof, and in which, Fig. 1 is a perspective view showing the device, with its two major leg portions in disengaged opened out positions, ready for washing or cleaning;

Fig. 2 is a perspective view showing the device of Figure 1, with its leg portions in engaged positions, ready for application of butter to an ear of corn, the latter being indicated in broken lines;

Fig. 3 is an enlarged sectional view taken on the plane 3—3 of Figure 2;

Fig. 4 is an enlarged sectional view taken substantially on plane 4—4 of Figure 2;

Figure 5:
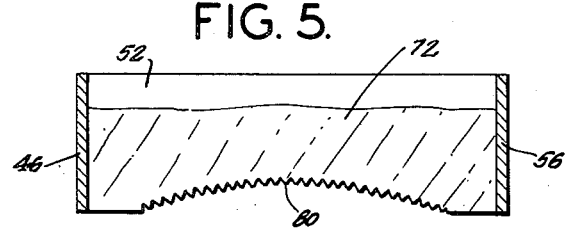
Fig. 5 is an enlarged sectional view taken on plane 5—5 of Figure 2.

The present invention has been conceived to make the eating of corn on the cob a more enjoyable eating habit. As it will retain and apply butter evenly and quickly, it will be far easier to manage and less messy to a larger extent than using a conventional table knife or fork. Where the latter are used, the heat of the corn is rapidly transmitted to the knive blade, and as a result of this condition, the manipulation of the butter with the knife or work becomes awkward, very unmanageable, and messy. Further, the present high cost of butter makes it doubly imperative that none of the butter drip or become lost otherwise.

The device described herein includes a pair of legs secured resiliently together at one end, and having jaws at their other ends, constructed to coact with end walls to form a butter receiving compartment, so that squeezing of the legs of the device together will compress the jaws together, the jaws being downwardly divergent, and hence will result in squeezing the butter in a downward direction onto the corn on the cob. In order to understand clearly the nature of the invention, and the best means for carrying it out, reference may now be had to the drawings, in which like numerals denote similar parts throughout the several views.

As shown, there is a first major leg member 20, formed of sheet metal or other suitable material including plastic, which is integral with a curved web 22, the other end of which is integrated with the second major leg member 24. As seen best in Figures 1 and 6, the web 22 resiliently interconnects the two major leg members 20 and 24, so that when they are in the opened out positions shown in Figure 1, and in broken lines in Figure 6, a substantial angle will exist between the leg members, as shown.

The leg members 20 and 24 have relatively long grasping or handle portions 26 and 28, with inbent portions 30 and 32 merging smoothly with forearm portions 34 and 36 disposed as shown, and inbent portions 38 and 40 merging with integral wrist portions 42 and 44. From Figure 6, it is seen that the portions 24, 34 and 42 are substantially parallel, and that the portions 28, 36 and 44 of the other major leg portion are also substantially parallel, when in the position shown in full lines in Figure 6.

Figure 6:
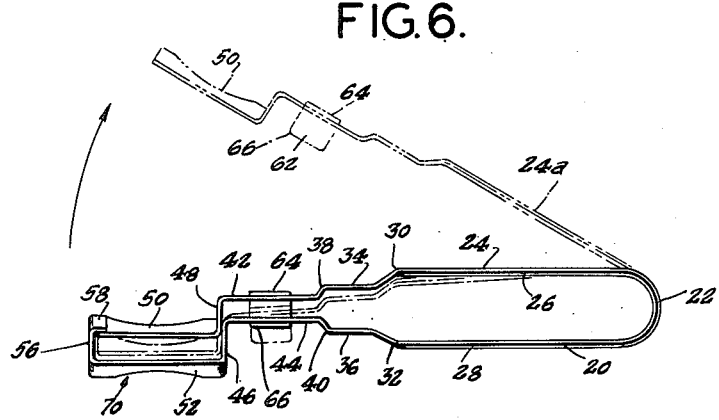
Fig. 6 is a top plan view of the device shown in Figure 2, and indicating in broken lines the opened out position of one of the major leg portions thereof.

A wall 46 is perpendicular to and integral with the wrist wall 44 of major leg member 20, and a corresponding wall 48 is perpendicular to and integral with the wrist wall 42 of the major leg member 24, so that, when in the positions shown in Figures 2 and 6, the walls 46 and 48 are substantially parallel with each other, and in close proximity, and in fact substantially in sliding contact with each other. Butter spreading jaw walls 50 and 52 are integral respectively with the walls 48 and 46, as shown, it being apparent that the wall 50 is in a plane perpendicular to the plane of wall 48, and intersecting with the same, while the wall 52 is in a plane perpendicular to the plane of wall 46 and intersecting with the same. However, from Figure 3 it is seen that the planes of walls 50 and 52 are downwardly divergent, so that their lower edges are further apart than their upper edges.

Figure 7:
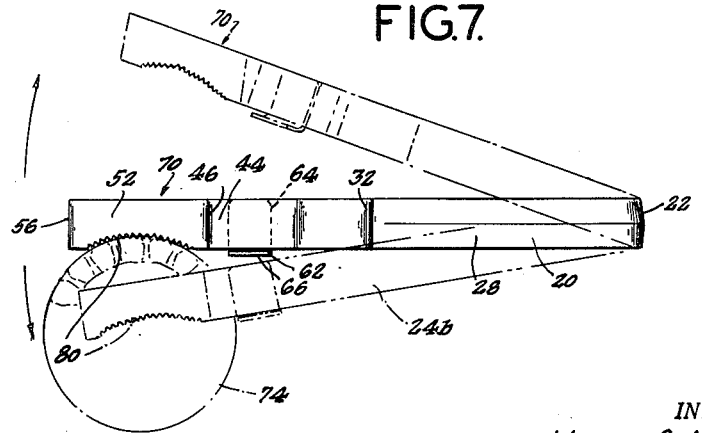
Fig. 7 is a front elevational view of Figure 6, illustrating the method of placing the leg members in effective position for use.

Similarly, it is seen that there is an end wall 56 which is integral with wall 52 and perpendicular thereto, being parallel with wall 46, and that the wall 56 has an inturned retaining or locking flange 58 which is integral therewith and turned perpendicular thereto as shown, so as to overlie the outer end of the wall 50 of the other major leg member 24 which disposed in the positions shown in Figures 2, 6 and 7. The locking flange 58 thus serves to retain the wall or jaw 50 against expanding further than the position shown in Figures 2 and 6, when the parts are in such engagement.

A keeper elbow member 62 has one leg 64 secured by welding or otherwise to the wall 42 of major leg member 24 for movement therewith, and has a bottom wall or leg 66 extending outwards at right angles thereto as shown, so that it underlies the wall 44 when in the positions shown in Figures 2 and 6, thus blocking the upward motion of the leg 24 and out of disengagement with the other leg 20. As a result, to disengage the leg 24 from the leg 20 when in the positions of Figures 2 and 6, it is necessary to move the leg member 24 downwards to the position shown in broken lines at 24b in Figure 7, at which it will clear the locking flange 58, and then allow it to spring outwardly to the position shown in full lines in Figure 1, for washing, cleaning, and other purposes.

To use the device, it is only necessary, with the parts in engaged positions as shown in Figures 2 and 6, to press the dispensing head 70, which includes both jaws 50 and 52 and the surrounding wall members, downwards into a slab of butter, so that the butter 72 will be scooped inside the dispensing head as seen in Figure 2. The dispensing head 70 is then brought over an ear 74 of corn on the cob, with its larger opening resting on the ear of corn in the manner shown in Figure 2, and the user then merely moves the dispensing head along the corn ear longitudinally in the directions of the arrows 76, back and forth, turning the corn as the new kernels are to be covered with butter.

By pressing the arms 26 and 28 together with his fingers, the user exerts wedging action on the butter between the downwardly divergent jaw walls 50 and 52, exerting a downward bias on the block of butter 72 which is in the dispensing chamber between the walls 50 and 52, forcing the butter downwards against the underlying ear of corn and thereon. The sloping jaw walls 50 and 52, through their wedging action on the butter slowly squeeze the butter downward into constant contact with the hot corn. This action causes the butter to be melted and distributed evenly over the kernels of the cob. To further enhance the distribution of the butter over the corn, I may provide curved serrated dispensing edges 80 formed in the lower edges of the jaw walls 50 and 52 of the device, the curvature of the dispensing edges being adapted to correspond substantially to the curvature of the corn cob, so that there is little if any leakage therepast.

For cleaning purposes, the device is unsprung, as shown in Figure 1, by depressing the leg 24 to the position 24b shown in Figure 7, and may be washed and thoroughly cleaned.

Although I have described my invention in specific terms, it will be understood that variations may be made in size, shape, materials and arrangement without departing from the spirit and scope of the invention as claimed.

I claim:

1. A butter applicator device comprising: a first leg member, a second leg member, web means interconnecting resiliently said first and second leg members, first inner end wall means carried by said first leg member and extending at right angles thereto, second inner end wall means carried by said second leg member and extending at right angles thereto and parallel to said first inner end wall means, first jaw means carried by said first inner end wall means and movable therewith, second jaw means carried by said second inner end wall means and movable therewith, said second inner end wall means acting as guiding means to induce relative rectilinear movement between said first and second jaw means, said first and second jaw means being downwardly divergent to form therebetween a butter compartment, and outer end wall means carried by said second jaw means and parallel to said second inner end wall means, and flange means extending substantially perpendicularly from said outer end wall means to block movement of said first jaw means out of engagement therewith; whereby, butter disposed between said first and second jaw means is squeezed downwardly out therefrom upon squeezing pressure on said first and second leg members.

2. The construction acocrding to claim 1 wherein said first and second jaw means have lower edges with a curved series of serrations formed in said lower edge, whereby, butter is spreadable evenly over an ear of corn as the device is moved longitudinally therealong while said first and second leg members are squeezed together.

References Cited in the file of this patent

UNITED STATES PATENTS

| Number | Name | Date |
|---|---|---|
| D. 157,183 | Newell | Feb. 7, 1950 |
| 117,130 | Ward | July 18, 1871 |
| 344,446 | Johnson | June 29, 1886 |
| 541,670 | Osse | June 25, 1895 |
| 576,211 | Martin | Feb. 2, 1897 |
| 1,097,465 | Pratt | May 19, 1914 |
| 1,253,917 | Wern | Jan. 15, 1918 |
| 1,390,547 | Rogers | Sept. 13, 1921 |
| 1,432,754 | Hollowell | Oct. 24, 1922 |
| 1,494,018 | Randolph | May 13, 1924 |
| 1,680,584 | Angell | Aug. 14, 1928 |
| 1,739,324 | Neissl | Dec. 10, 1929 |
| 1,893,889 | Gierini | Jan. 10, 1933 |
| 1,948,880 | Hamm | Feb. 27, 1934 |
| 2,090,913 | Johnson | Aug. 24, 1937 |
| 2,291,679 | Berkeley | Aug. 4, 1942 |
| 2,454,905 | Allen | Nov. 30, 1948 |
| 2,478,122 | Mossel | Aug. 2, 1949 |
| 2,601,766 | Riddell et al. | July 1, 1952 |